US008811946B2

(12) United States Patent
Nakama (10) Patent No.: US 8,811,946 B2
(45) Date of Patent: Aug. 19, 2014

(54) COMMUNICATION APPARATUS PROVIDING COMMUNICATION BY USING STORED IDENTIFICATION INFORMATION

(75) Inventor: Satoshi Nakama, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 443 days.

(21) Appl. No.: 12/517,343

(22) PCT Filed: Jun. 24, 2008

(86) PCT No.: PCT/JP2008/061798
§ 371 (c)(1),
(2), (4) Date: Jun. 2, 2009

(87) PCT Pub. No.: WO2009/008274
PCT Pub. Date: Jan. 15, 2009

(65) Prior Publication Data
US 2010/0099381 A1 Apr. 22, 2010

(30) Foreign Application Priority Data

Jul. 10, 2007 (JP) .................................. 2007-181113
May 9, 2008 (JP) .................................. 2008-123436

(51) Int. Cl.
*H04M 1/66* (2006.01)
*H04M 1/725* (2006.01)
*H04W 80/00* (2009.01)
*H04W 88/02* (2009.01)
*H04Q 3/74* (2006.01)

(52) U.S. Cl.
CPC ...... *H04M 1/72522* (2013.01); *H04M 2250/58* (2013.01); *H04M 2203/2061* (2013.01); *H04M 2242/30* (2013.01); *H04M 1/72572* (2013.01); *H04M 2207/18* (2013.01); *H04W 80/00* (2013.01); *H04W 88/02* (2013.01); *H04Q 3/74* (2013.01); *H04Q 2213/13103* (2013.01)
USPC ........ 455/411; 455/146; 455/145; 455/154.2; 455/457

(58) Field of Classification Search
CPC ..................... H04M 1/72522; H04M 2250/58; H04M 2203/2061; H04M 2242/30; H04M 1/72572; H04M 2207/18; H04W 80/00; H04W 88/02; H04Q 3/74; H04Q 2213/13103
USPC ....................... 455/411, 146, 145, 154.2, 457
See application file for complete search history.

(56) References Cited

U.S. PATENT DOCUMENTS 5,436,436 A * 7/1995 Matsukawa .................... 235/380

(Continued)

FOREIGN PATENT DOCUMENTS

EP 0574006 A1 12/1993

(Continued)

OTHER PUBLICATIONS

International Preliminary Report on Patentability dated Jan. 21, 2010 in corresponding International Application No. PCT/JP2008/061798.

(Continued)

*Primary Examiner* — Nimesh Patel
(74) *Attorney, Agent, or Firm* — Fitzpatrick, Cella, Harper & Scinto (57) ABSTRACT

A communication apparatus includes: an interface for reading out identification information regarding a communication carrier from a storage medium in which the identification information is stored; a communication unit for deciding the communication carrier based on the identification information read out by the interface and making communication by using the decided communication carrier; an authentication unit for making an authentication by using the identification information read out by the interface; a control unit for enabling a communicating operation by the communication unit according to a success in the authentication by the authentication unit; and a display control unit for allowing an authenticating display screen for making the authentication to be displayed onto a display apparatus. The display control unit decides a display language based on the identification information read out by the interface and changes a display language on the authenticating display screen according to the decided language.

14 Claims, 9 Drawing Sheets

(56) References Cited

U.S. PATENT DOCUMENTS

| | | | |
|---|---|---|---|
| 5,732,349 A * | 3/1998 | Sanpei et al. | 455/435.1 |
| 6,226,500 B1 * | 5/2001 | Nonami | 455/91 |
| 6,662,023 B1 | 12/2003 | Helle | |
| 2003/0057271 A1 | 3/2003 | Andersen et al. | |
| 2003/0144830 A1 | 7/2003 | Williams | 704/1 |
| 2004/0064318 A1 | 4/2004 | Niemoeller et al. | 704/270.1 |

FOREIGN PATENT DOCUMENTS

| | | |
|---|---|---|
| EP | 1213897 | 6/2002 |
| JP | 5344187 | 12/1993 |
| JP | 11313148 | 11/1999 |
| JP | 2002-077372 | 3/2002 |
| JP | 2003-134257 | 5/2003 |
| JP | 2003-189361 | 7/2003 |
| JP | 2003-298685 | 10/2003 |
| JP | 2005-079996 | 3/2005 |
| JP | 2006-018700 | 1/2006 |

OTHER PUBLICATIONS

PCT International Search Report, Mailing Date Sep. 2, 2008, in PCT/JP2008/061798.

Office Action dated Mar. 7, 2012 in corresponding Chinese Patent Application No. 200880022984.6, with English translation thereof.

Official Action dated Oct. 26, 2010 in Russian Application No. 2009136574/09(051689).

Mouly M; Pautet M-B, "Mobility and Security Management" GSM System for Mobile Communications, Jan. 1, 1993, pp. 432-498, XP000860007.

European Search Report dated Jul. 21, 2011 in corresponding European Application No. 08777699.3.

\* cited by examiner

COMMUNICATION APPARATUS PROVIDING COMMUNICATION BY USING STORED IDENTIFICATION INFORMATION

TECHNICAL FIELD

The invention relates to a communication apparatus and, more particularly, to an apparatus for making communication by using a storage medium on which identification information regarding a communication carrier has been stored.

BACKGROUND ART

Hitherto, a cellular phone has been known as a portable communication terminal. A diffusion rate of the cellular phones is increasing year by year and there is also a user who possesses a plurality of cellular phones among the users.

There is also such a demand that the user desires that the telephone which is used on a daily basis is also used in foreign countries. A demand for a GSM (Global System for Mobile Communications) telephone which has widely been spread all over the world is also increasing.

In the GSM cellular phone, communication and other functions are realized by using an IC (Integrated Circuit) card called an SIM (Subscriber Identification Module) card.

Subscriber identification information such as telephone (subscriber) number, carrier (contracted company and its communication system), and the like has been stored in the SIM card every telephone line contract. By inserting the SIM card into the telephone and reading out the identification information from the SIM card, telephone calls of an outgoing call and an incoming call can be performed. By exchanging the SIM card which is inserted into the telephone, a plurality of telephones can be selectively used by using one contract telephone line.

In the case where one user made contracts of a plurality of communication telephone lines, an SIM card in which identification information of each contract has been stored is provided. Therefore, by exchanging the SIM card which is inserted into the telephone, a plurality of telephone lines can be selectively used by one telephone.

Ordinarily, the SIM card has a construction in which it cannot be easily removed. Depending on the cellular phone, there is also such a cellular phone that if the SIM card is not inserted, all functions such as browsing of a phone book, photographing by a camera, and the like as well as the outgoing/incoming calls cannot be used.

Among the SIM cards, there is also such an SIM card that in addition to the phone book and personal information of the contractor, contents such as still images and the like can be stored.

Therefore, in the cellular phones, generally, when the SIM card is inserted, a personal identification number called a PIN (Personal Identify Number) code is allowed to be input. By discriminating whether or not the regular user uses the SIM card, safety is assured (for example, refer to Japanese Patent Application Laid-Open No. 2002-077372: corresponding U.S. Pat. No. 6,662,023).

If the user as a person who uses the cellular phones possesses the SIM card, since she or he can freely select the cellular phone, the cellular phones of not only domestic makers but also foreign makers can be used. Each maker assures advanced functions of the cellular phone and provides E-mail, an Internet access, a game obtained by downloading an application, a music delivery, a video streaming, a reception of a television signal, and the like to the user.

As mentioned above, in order to use the cellular phone using the SIM card, the user needs to insert the SIM card and, thereafter, input the PIN code.

For example, if no SIM card is inserted into the cellular phone, by displaying a message or an image for urging the insertion of the SIM card onto a display screen of the telephone, an environment in which the outgoing/incoming calls can be made can be provided for the user.

By inserting the SIM card here, a display screen adapted to input the PIN code is displayed and a message for prompting the input of the PIN code is displayed, thereby enabling a process to be shifted to a procedure for making a user authentication.

However, by using the SIM card, the user can use various domestic and foreign cellular phones. Therefore, such a situation that the user uses a terminal which displays the message by a language other than a language which can be read or understood by the user is also considered.

If the message for requesting the input of the PIN code is displayed by the language which cannot be read by the user as mentioned above, the user cannot understand such a request.

Although the SIM card can be removed from the telephone and inserted into another telephone as mentioned above, it is a rare case that the SIM card is frequently removed and inserted. There are also many users who forget that it is necessary to input the PIN code after the insertion of the SIM card.

Therefore, there is such a problem that the user cannot understand the necessity of the input of the PIN code or it takes a long time and much troublesomeness until she or he understands it and can use the cellular phone.

DISCLOSURE OF THE INVENTION

It is an aspect of the present invention to solve such a problem and properly set a language for displaying information necessary for using an apparatus, thereby enabling the user to easily use the apparatus.

According to an aspect of the present invention, a communication apparatus comprises: an interface unit that reads out identification information regarding a communication carrier from a storage medium in which the identification information is stored; a communicating unit that decides the communication carrier based on the identification information read out by the interface unit and making communication by using the decided communication carrier; an authenticating unit that makes an authentication by using the identification information read out by the interface unit; a control unit that enables a communicating operation by the communicating unit according to a success in the authentication by the authenticating unit; and a display control unit that allows an authenticating display screen for making the authentication to be displayed onto a display apparatus, wherein the display control unit decides a display language based on the identification information read out by the interface unit and changes a display language of the authenticating display screen according to the decided language.

Further features and aspects of the present invention will become apparent from the following description of exemplary embodiments with reference to the attached drawings.

BRIEF DESCRIPTION OF THE DRAWINGS

FIG. 6 which is composed of FIGS. 6A and 6B are flowcharts illustrating the authenticating operation of a PIN code in the embodiment.

BEST MODE FOR CARRYING OUT THE INVENTION

Exemplary embodiments according to the invention will be described in detail hereinbelow with reference to the accompanying drawings.

Figure 1:
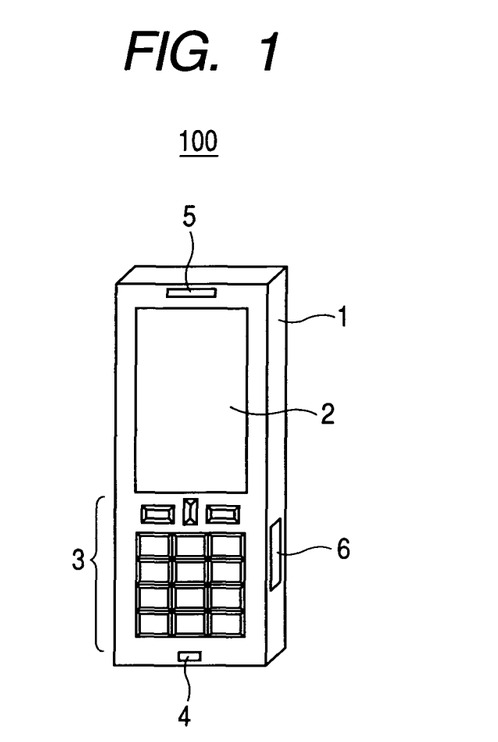
FIG. 1 is an external view of a cellular phone in an embodiment of the invention.

FIG. 1 is a diagram illustrating an external construction of a cellular phone as an embodiment of the invention.

A cellular phone 100 (hereinbelow, referred to as a telephone) can make communication by a plurality of communication systems. In the embodiment, the communication can be made by a W-CDMA system and a CDMA 2000 system. Naturally, other communication systems may be used and a telephone call by three or more communication systems can be also performed.

The telephone 100 has a multimedia function such as a television telephone communication and the like, an E-mail transmitting/receiving function, and a WEB browsing function as well as a voice communicating function. Further, the cellular phone 100 has a phone book function, an electric databook function, a function for downloading an application such as a game or the like and using it, a navigating function, and a music reproducing function.

It is assumed that an antenna and a vibrator which is vibrated at the time of an incoming call have been built in a housing 1 of the cellular phone 100. A liquid crystal display unit (LCD) 2 is provided for a front surface of the housing 1. A speaker 5 is arranged above the LCD 2. A microphone 4 for inputting a voice at the time of a telephone call is arranged in a lowest portion of the housing 1. A key operation unit 3 for inputting operations regarding various kinds of functions in addition to a telephone call function is provided in a lower portion of the housing 1. A memory card slot 6 into which a memory card (not shown) can be inserted is provided in a side surface of the housing 1. Data for executing the various kinds of functions which are used in the telephone 100 and the like can be stored into the memory card.

Figure 2:
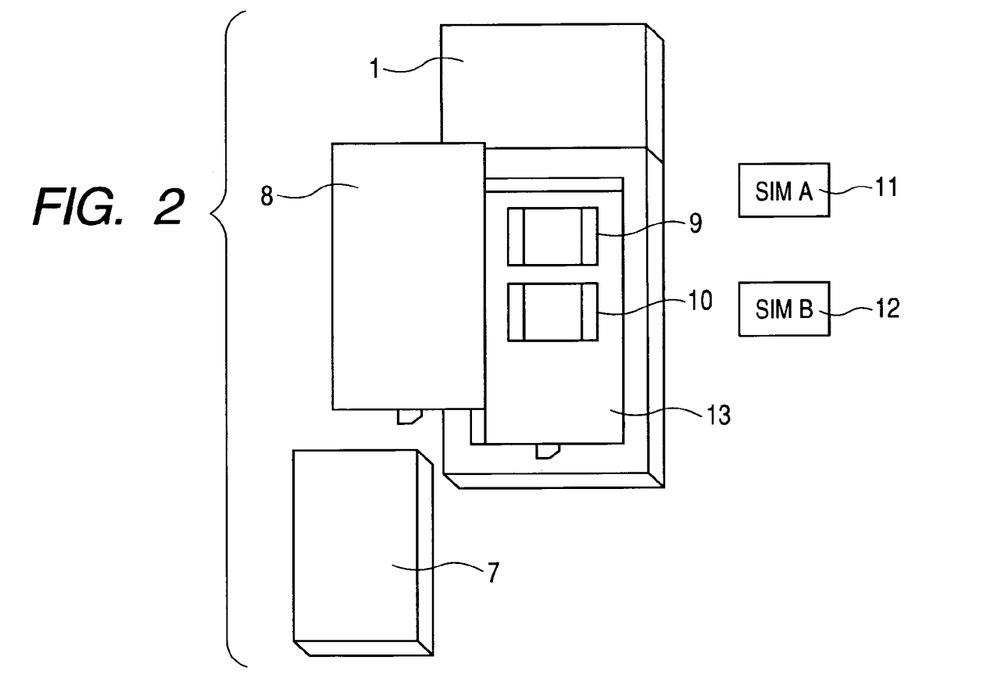
FIG. 2 is an external view of the cellular phone in the embodiment.

FIG. 2 is a constructional diagram when the cellular phone 100 is seen from a back side.

An enclosing portion 13 adapted to enclose a battery pack 7 is provided for the back side of the telephone 100. The enclosing portion 13 is covered with a battery cover 8 and has a construction in which the battery cover cannot be easily opened. In a state where the battery cover 8 is opened and the battery pack 7 is removed, it appears that two SIM slots 9 and 10 adapted to insert SIM cards are provided.

An SIM card (A) 11 and an SIM card (B) 12 can be inserted into the SIM slot (A) 9 and the SIM slot (B) 10, respectively. Each of the SIM cards 11 and 12 can be freely removed.

Although the embodiment has been described with respect to the case where two SIM slots were provided, three or more SIM slots may be also provided. A position of each SIM slot may be set to a battery pack attaching portion of the back surface of a straight type housing illustrated in FIG. 1. Or, if a space can be assured in a foldable housing, each SIM slot may be provided for the side surface.

A slot of the SIM card can be also provided so that the SIM card can be replaced without removing the battery.

Figure 3:
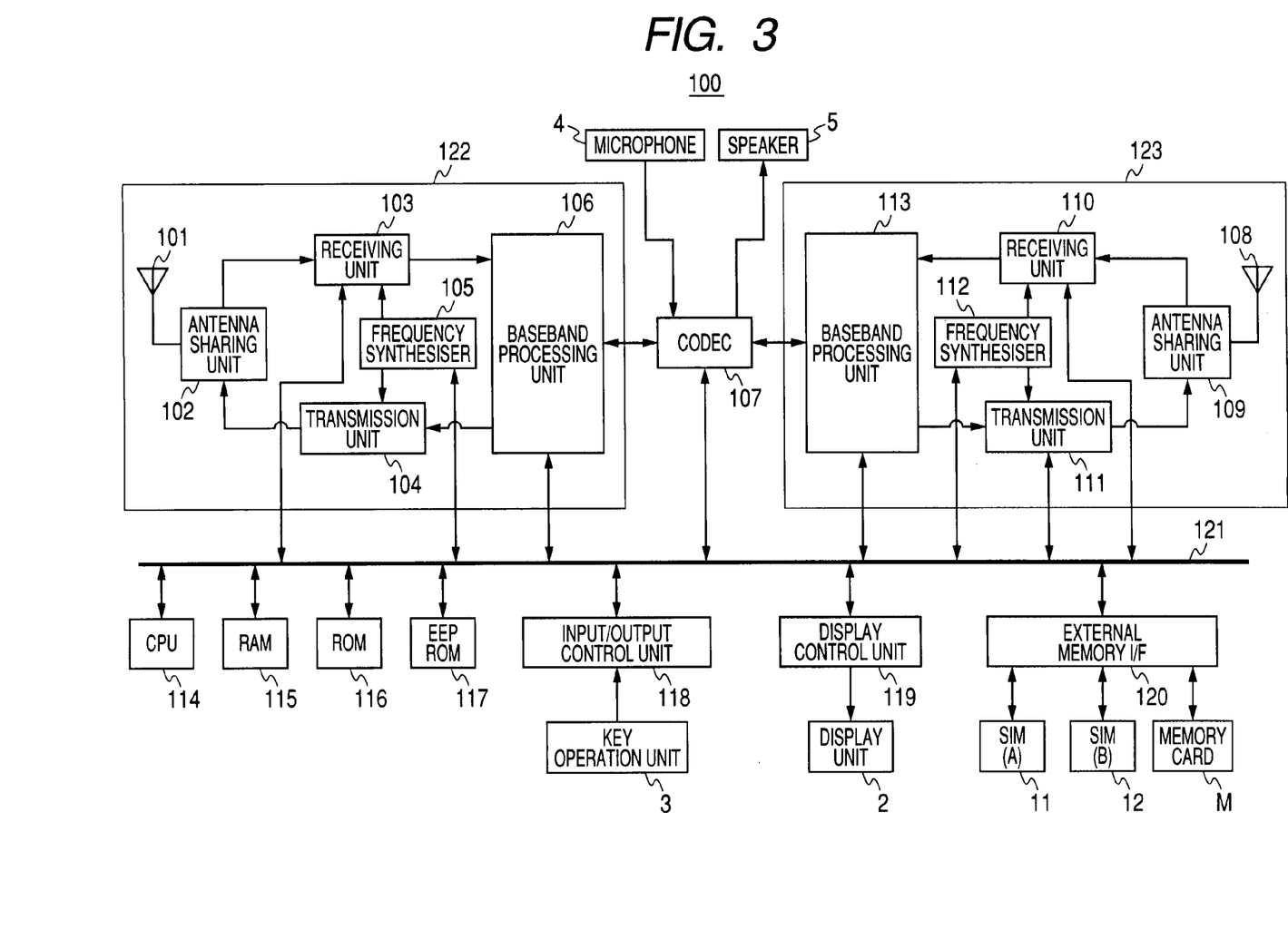
FIG. 3 is a block diagram illustrating a construction of the cellular phone.

FIG. 3 is a block diagram illustrating an internal construction of the telephone 100 in FIG. 1. In the block diagram of FIG. 3, only blocks necessary for the telephone call function and the E-mail transmitting/receiving function are mainly illustrated. Although the telephone 100 has various kinds of functions in addition to the telephone call function and the mail transmitting/receiving function as mentioned above, with respect to the blocks regarding those functions and their detailed description, well-known constructions are used and their detailed description is omitted.

In FIG. 3, various kinds of operations of the telephone 100 are controlled by a CPU 114. The CPU 114 controls each unit through a CPU bus 121. A RAM 115 and a ROM 116 for storing data and programs and an EEPROM 117 as a non-volatile memory which can hold data even if a power source is turned off are connected to the CPU bus 121.

The CPU 114 receives a key input from the key operation unit 3 through an input/output control unit 118 and controls so that buttons of the key operation unit 3 are lit on. The CPU 114 controls a display control unit 119 so as to display various kinds of images and information onto the display unit 2.

The CPU 114 reads out information of the SIM cards inserted into the SIM slot (A) 9 and the SIM slot (B) 10 through an external memory interface unit (I/F) 120. Further, the CPU 114 executes the writing and reading of data into/from a memory card M inserted through the memory card slot 6.

The telephone 100 has a communication unit 122 for a W-CDMA system (first communication system) and a communication unit 123 for a CDMA 2000 system (second communication system). As will be described hereinafter, the communication unit 123 is selected according to subscriber information read out from the inserted SIM card 11 or 12, and communication is made.

First, a telephone call, a fundamental incoming call of E-mail, and a transmitting process in the telephone 100 will be described.

Processes at the time of the incoming call by the first communication unit 122 will now be described as an example.

A radio signal which is transmitted from a base station (not shown) is received by an antenna 101. The received signal is input to a receiving unit 103 through an antenna sharing unit 102. The receiving unit 103 has a high frequency amplifier, a frequency converter, and a demodulator. After the received signal was low-noise amplified by a low-noise amplifier, the receiving unit 103 mixes the amplified signal to an incoming local outgoing signal generated by a frequency synthesizer 105 and frequency-converts the mixed signal into an incoming intermediate frequency signal or an incoming baseband signal. The frequency-converted signal is demodulated by the demodulator.

The demodulated signal is transmitted to a baseband processing unit 106 and then separated into an audio signal and E-mail data. Audio data is decoded by a codec 107 according to the communication system and output to the speaker 5.

The E-mail data is transmitted to the RAM 115 and stored therein. By operating the key operation unit 3, the user can arbitrarily read out the E-mail data stored in the RAM 115 and display it onto the display unit 2.

As mentioned above, when a voice call is received, a voice of the partner is generated from the speaker 5.

When the voice during the telephone call is transmitted, the audio signal of the user generated from the microphone 4 is encoded by the codec 107 according to the communication system. The coded audio data is subjected to necessary processes by the baseband processing unit 106 and output to a transmission unit 104. The transmission unit 104 has a modulator, a frequency converter, and a transmission power amplifier. After audio data was modulated according to the communication system, the transmission unit 104 mixes the modulated data with an outgoing local outgoing signal generated from the frequency synthesizer 105 and frequency-converts the mixed signal into a radio frequency signal. After the converted signal was amplified, the amplified signal is transmitted toward the base station (not shown) through the antenna sharing unit 102 and the antenna 101.

By operating the key operation unit 3, the user can finish the telephone call.

Subsequently, processes at the time of the outgoing call will be described.

By operating the key operation unit 3, the user inputs a partner's telephone number and instructs the outgoing call. When the outgoing call is instructed, the CPU 114 sends data for the outgoing call to the baseband processing unit 106. The baseband processing unit 106 transfers the data for the outgoing call to the transmission unit 104, executes the processes such as modulation, frequency conversion, and amplification as mentioned above, and transmits the processed signal toward the base station (not shown) by the antenna sharing unit 102 and the antenna 101.

When the base station confirms the incoming call from the communication partner and sends a radio signal, the antenna 101 receives it and subsequently executes processes similar to those at the time of the foregoing incoming call.

When the E-mail is transmitted, the user instructs the creation of the mail by using the key operation unit 3. When the creation of the mail is instructed, the CPU 114 controls the display control unit 119 so as to display a display screen for making the mail onto the display unit 2. By using the key operation unit 3, the user inputs a transmission destination address and a text and instructs the transmission. When the transmission of the mail is instructed, the CPU 114 sends information of the address to the baseband processing unit 106 and sends data of the text to the codec 107. The codec 107 encodes the data of the text and sends the coded data to the baseband processing unit 106.

The baseband processing unit 106 sends the address and the data of the text to the transmission unit 104, executes processes such as modulation and the like by the transmission unit 104 and transmits to the base station through the antenna sharing unit 102 and the antenna 101.

In the present embodiment, subscriber identification information is read out from the SIM cards inserted into the SIM slot (A) 9 and the SIM slot (B) 10 and a communicating process is executed based on the subscriber information.

The SIM cards will now be described.

Figure 4:
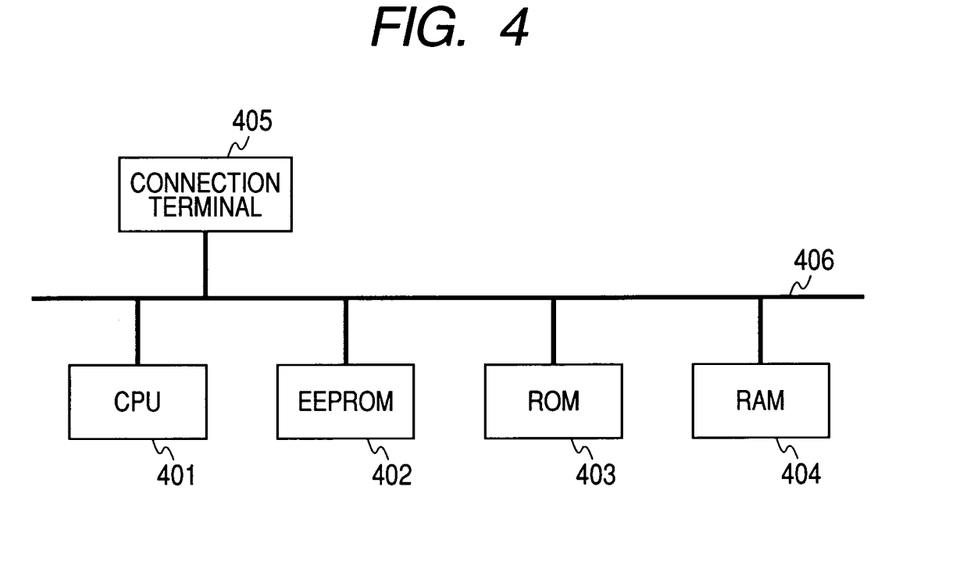
FIG. 4 is a diagram illustrating a construction of an SIM card.

FIG. 4 is a diagram illustrating an internal construction of the SIM cards 11 and 12.

The SIM card has therein a CPU 401, an EEPROM 402, a ROM 403, and a RAM 404 and each block is connected by a CPU bus 406. Various kinds of functions can be executed by activating an OS (Operating System) stored in the ROM 403. The SIM card cannot solely operate. Therefore, when the SIM card is inserted into the telephone 100 and an electric power is supplied thereto from a connection terminal 405, the CPU 401 is activated, the data is developed into the RAM 404, and various kinds of information are input and output through the terminal 405.

Information which is peculiar to each card has been allocated to the SIM card and communication with the carrier can be made or a phone book can be updated based on such information. The peculiar information has been stored in the EEPROM 402 or the ROM 403 and is read out in response to a call from the CPU 401.

Subsequently, the information stored in the SIM card will be described.

Figure 5:
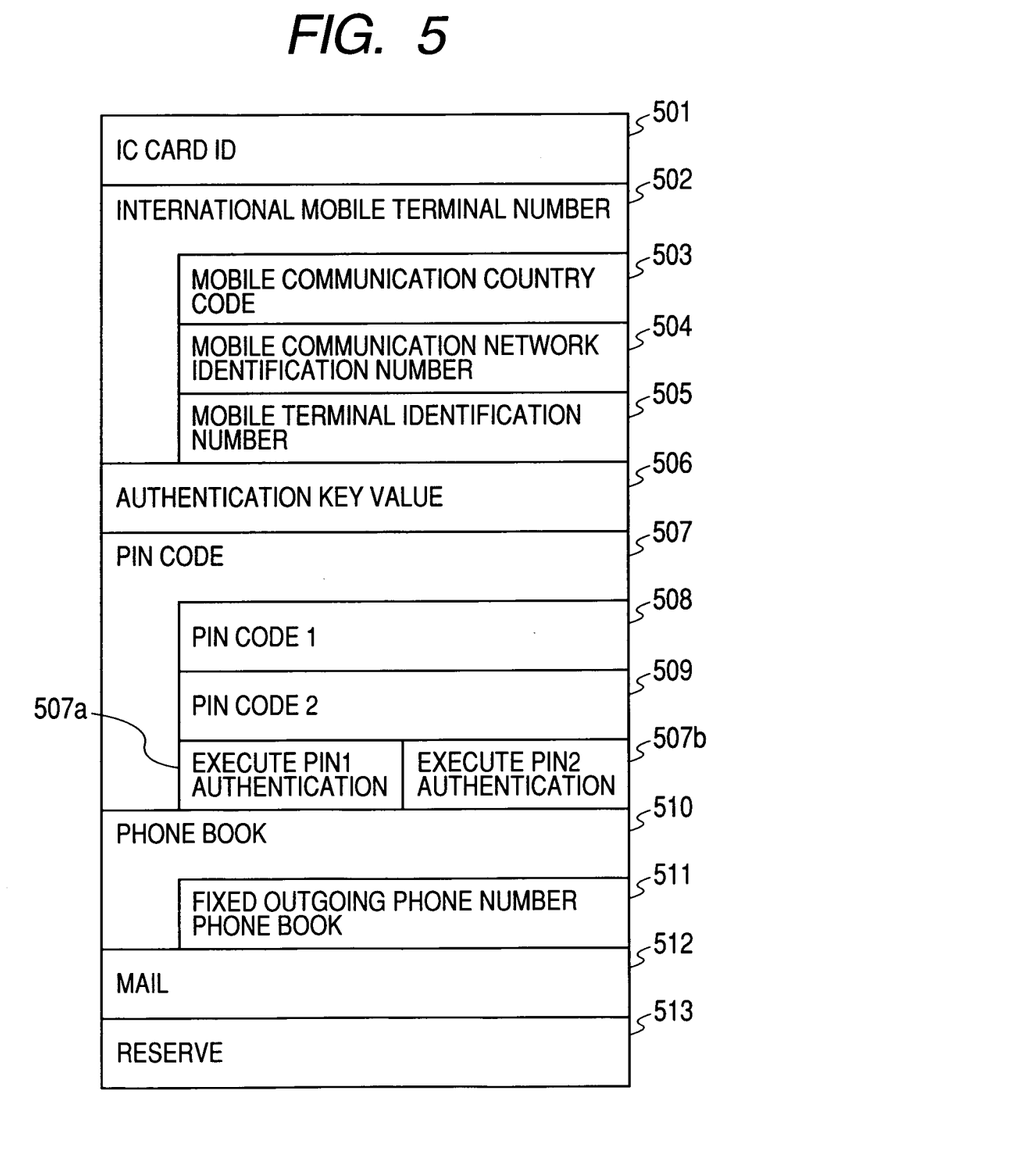
FIG. 5 is a diagram illustrating a state of data stored in the SIM card.

FIG. 5 is a diagram illustrating the information stored in the EEPROM 402 or the ROM 403 in the SIM card illustrated in FIG. 4.

An IC card ID 501, an international mobile terminal number 502, an authentication key value 506, a PIN code 507, phone book information 510, mail data 512, and a reserve 513 are stored in each SIM card.

The IC card ID 501 is information for uniquely identifying the card. The international mobile terminal number 502 is information for specifying the subscriber who is provided by the contracted carrier. The international mobile terminal number 502 includes: a mobile communication country code 503; a mobile communication network identification number 504; and a mobile terminal identification number 505. The country of the contracted carrier can be identified by the mobile communication country code 503. The contracted carrier can be identified by the mobile communication network identification number 504. The mobile terminal identification number 505 is provided as a telephone number to the subscriber.

The authentication key value 506 is information for authenticating with the telephone in order to access the telephone network which is provided by the carrier. The PIN (Personal Identify Number) code 507 is an authentication code for specifying the user when the SIM card has been inserted into the telephone in order to prevent the telephone from being used by the third party without permission. Two kinds of PIN codes can be stored. The PIN code 507 includes 1-bit PIN authentication execution data 507a and 507b showing whether or not the authentication by the PIN code 1 and the PIN code 2 is made.

The phone book 510 includes a fixed outgoing phone number phone book 511 which can be transmitted by inputting a PIN code 509. In the embodiment, information of fonts corresponding to the country information of the SIM card has been stored in the reserve area 513.

Subsequently, the setting of the PIN code and the execution setting of the PIN code authentication will be described.

By operating the key operation unit 3, the user can set an arbitrary PIN code into each of the SIM cards 11 and 12.

That is, when the PIN code setting is instructed by the user, the CPU 114 allows a PIN code setting display screen to be displayed onto the display unit 2 by the display control unit 119. The user can independently set the PIN codes into the SIM cards 11 and 12, respectively.

Therefore, the user operates the key operation unit 3 while looking at the PIN code setting display screen, selects either the SIM card 11 or 12, and inputs the PIN code into the selected SIM card.

When the PIN code is input, the CPU 114 changes the PIN code 508 or 509 of the selected SIM card to the PIN code which has been input by the user and stores it into the external memory I/F 120.

By operating the key operation unit 3, the user can set whether or not the authentication by the PIN code which has been set as mentioned above is made.

When the setting of the PIN code authentication is instructed by the user, the CPU 114 allows a display screen for execution setting of the PIN code authentication to be displayed onto the display unit 2 by the display control unit 119. The user can independently set whether or not the authentication by the PIN code is made into the SIM cards 11 and 12, respectively.

Therefore, the user operates the key operation unit 3 while looking at the display screen for execution setting of the PIN code authentication, selects either the SIM card 11 or 12, and inputs whether or not the authentication by the PIN code is executed with respect to the selected SIM card.

When whether or not the PIN code authentication is executed is set, the CPU 114 changes data 507a and 507b showing whether or not the PIN code authentication is executed onto the selected SIM card according to a setting result of the user and stores them into the external memory I/F 120.

If the execution of the authentication processing of the user by the PIN code has been set as mentioned above, each time the power source of the telephone 100 is turned on, the authentication processing by the PIN code is executed as will be described hereinafter. Unless the authentication is successfully made, while the SIM card is inserted, all of the functions of the cellular phone 100 are stopped and the user cannot use the cellular phone 100.

By setting the execution of the PIN code authentication processing as mentioned above, even in the case where the user dropped his own SIM card or the like, such a situation that his own SIM card is inserted into a cellular phone of another person and the cellular phone is used can be prevented.

Subsequently, a detecting process of the SIM card and control of the communication units 122 and 123 at the time of the power-on will be described with reference to a flowchart of FIG. 8.

In the telephone 100 of the present embodiment, the SIM card cannot be taken out of the SIM slot while the power source is ON. Therefore, when the user inserts or removes the SIM card, the power source of the telephone 100 is turned off.

Figure 8:
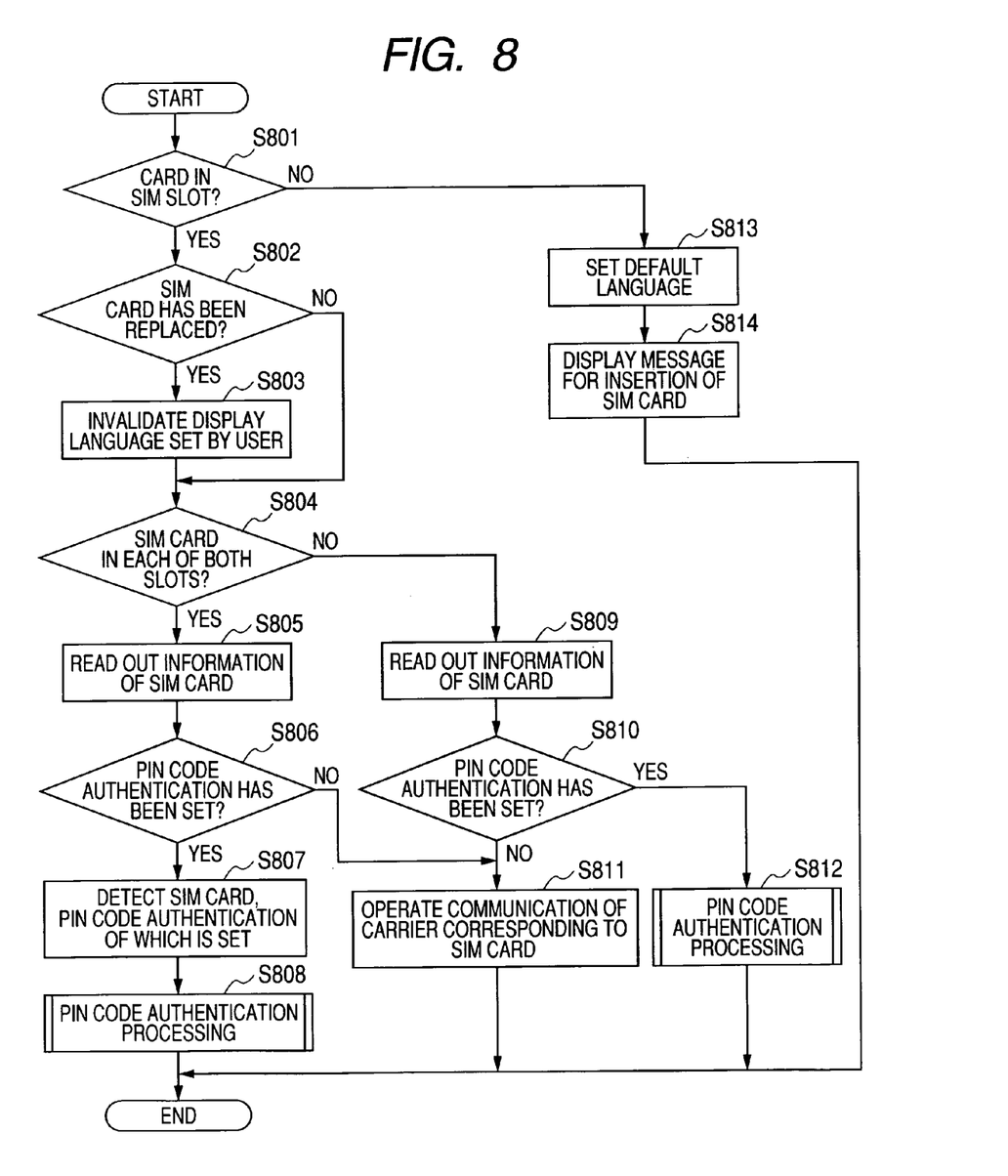
FIG. 8 is a flowchart illustrating a PIN code authentication processing at the time of turn-on of a power source.

When the power source is turned on, the flowchart of FIG. 8 is started. Processes of FIG. 8 are executed by a method whereby the CPU 114 controls each unit.

First, whether or not the SIM card has been inserted into any one of the SIM slots is discriminated (S801). If the SIM card had been inserted into any one of the SIM slots, whether or not the SIM card has been replaced is discriminated (S802). In the embodiment, since the SIM card and the telephone 100 are electrically connected, whether or not the SIM card has been replaced is discriminated based on whether or not such a connection has been disconnected. In this instance, when the card inserted into at least one of the two SIM slots has been replaced, it is decided that the SIM card has been replaced.

If the SIM card is not replaced, S804 follows.

If the SIM card has been replaced, the setting of the display language for the PIN code authentication of the telephone by the user is invalidated (S803).

In the present embodiment, after the authentication of the PIN code was finished, the user can also change the display language to a language other than the language which has been set based on the SIM card by using a menu display screen of the telephone 100. For example, after the SIM card purchased in Japan was authenticated, in the case where the language of the phone book is other than Japanese or in the case where the user wants to use his favorite font, the user can change the setting of the display language. In the present embodiment, the change of the display language by the user is inhibited until the authentication of the PIN code is successfully made. When the user changes the display language, the setting of the display language by the user is validated and information of the language after the change is stored into the EEPROM 117.

Subsequently, whether or not the SIM cards have been inserted into both of the two SIM slots 9 and 10 is discriminated (S804).

If the SIM cards have been inserted in both of the SIM slots 9 and 10, information of the SIM card inserted in each SIM slot is read out (S805). Whether or not the execution of the PIN code authentication has been set for each SIM card is discriminated based on the PIN authentication execution data 507a in FIG. 5 (S806).

If the execution of the PIN code authentication has been set for at least one of the SIM cards, the SIM card in which the PIN code authentication has been set is detected (S807) and the PIN code authentication processing is executed (S808). The PIN code authentication processing will be described hereinafter.

If the execution of the PIN code authentication is not set for both of the SIM cards in S806, one of the communication units 122 and 123 corresponding to the carrier of the inserted SIM card is made operative (S811).

If the SIM card has been inserted only in one of the SIM slots in S804, the information is read out of the inserted SIM card (S809). Whether or not the execution of the PIN code authentication has been set for the SIM card is discriminated based on the PIN code authentication execution data 507a in FIG. 5 (S810).

If the execution of the PIN code authentication has been set for the inserted SIM card, the PIN code authentication processing is executed (S812). If the execution of the PIN code authentication is not set, one of the communication units 122 and 123 corresponding to the carrier of the inserted SIM card is made operative (S811).

If the SIM cards are not inserted in both of the SIM slots in S801, a default language of the telephone 100 is set as a display language (S813). In the embodiment, information of an initial setting (default) language of the telephone 100 has been stored in the EEPROM 117. In order to notify the user that no SIM card is inserted, a message showing that the telephone 100 cannot be used unless the SIM card is inserted is displayed onto the display unit 2 by using the default language (S814).

Figures 6, 6A:
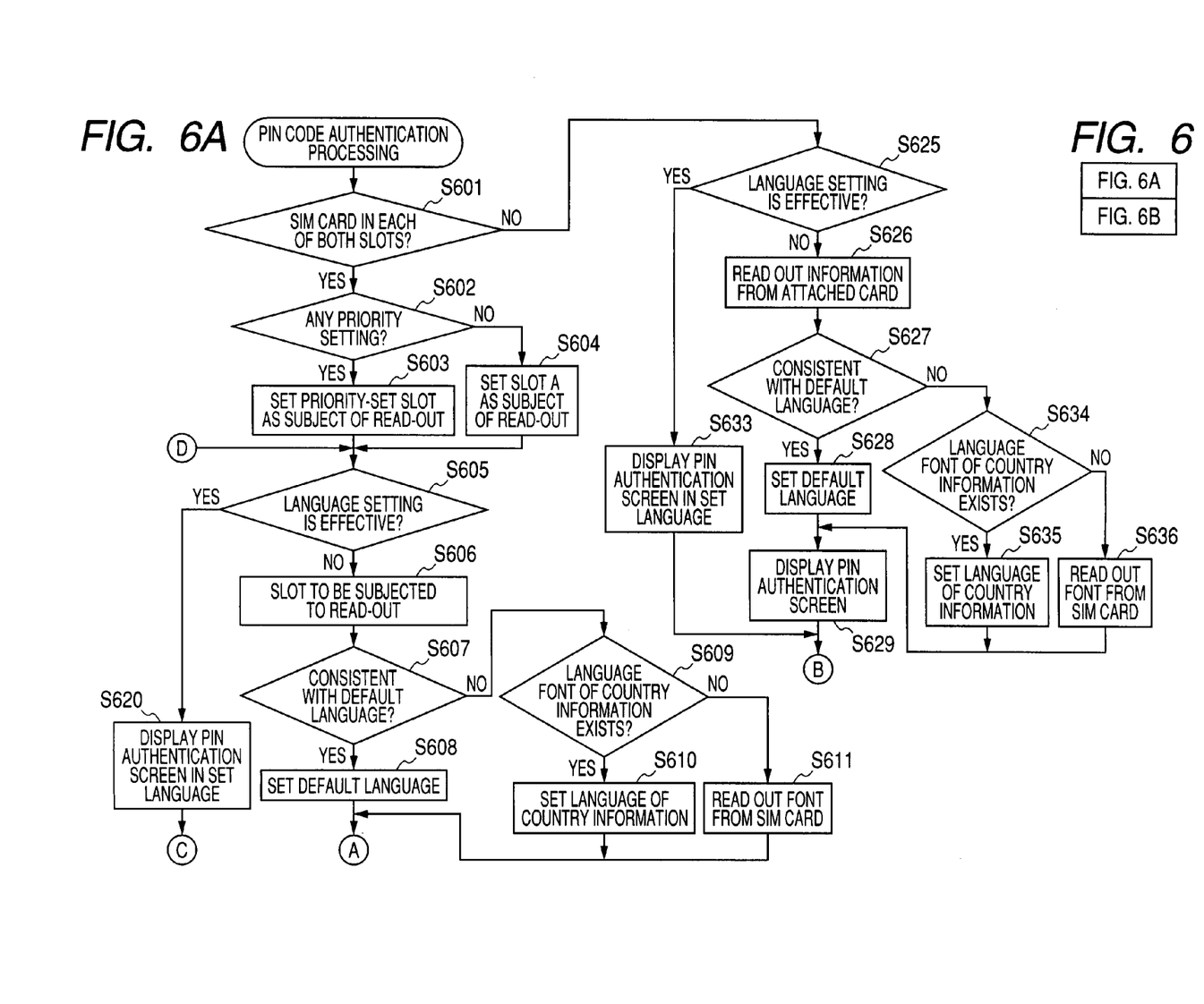
Figure 6B:
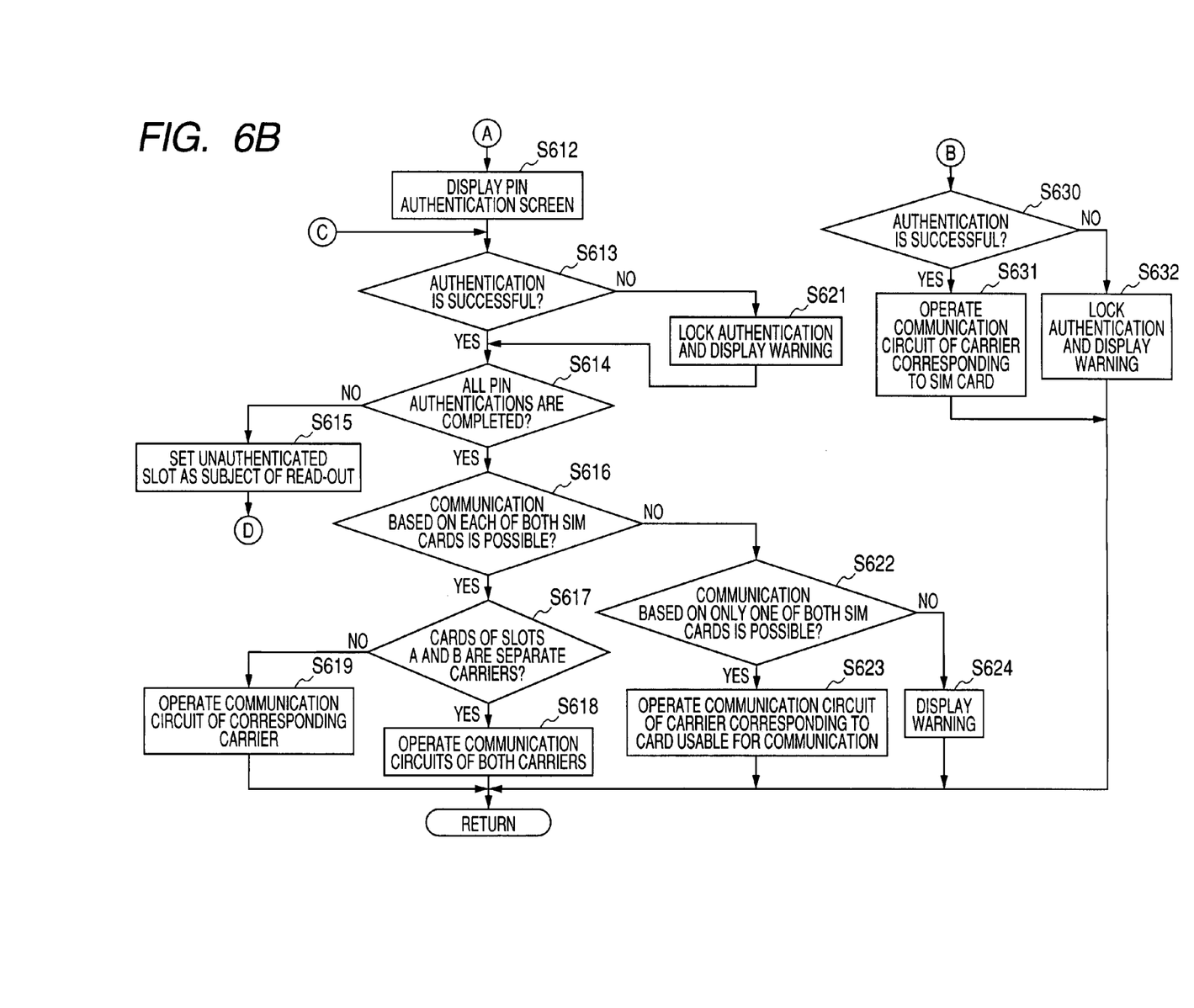

Subsequently, the PIN code authentication processing of S808 and S812 will be described with reference to a flowchart of FIGS. 6A and 6B. Processes of FIGS. 6A and 6B are also executed by a method whereby the CPU 114 controls each unit.

First, whether or not the SIM cards have been inserted into both of the two SIM slots 9 and 10 is discriminated (S601).

If the SIM cards had been inserted into both of the SIM slots, whether or not priorities have been set into the two SIM slots is discriminated (S602). By previously operating the key operation unit 3, the user can set the priorities into the two SIM slots. Thus, when the SIM cards have been inserted into both of the two SIM slots, the user sets from which slots a confirmation of the SIM card is started.

If the priority has been set, the priority-set slot between the SIM slots 9 and 10 is set as a subject slot of the read-out (S603). If no priorities are set, the SIM slot (A) 9 is set as a subject slot of the read-out (S604).

Subsequently, whether or not the setting of the display language by the user is effective is discriminated (S605). If the display language setting is not effective, the subscriber information as illustrated in FIG. 5 is read out from the SIM card inserted into the read-out subject slot and stored into the RAM 115 (S606).

Subsequently, in the subscriber information read out from the SIM card, the language according to the mobile communication country code 503 is compared with the using language which has initially been set in the telephone 100. The information of the initial setting (default) language of the telephone 100 has been stored in the EEPROM 117. In the embodiment, whether or not the first official language which is used in the country designated by the mobile communication country code 503 is consistent with the default language of the telephone 100 is discriminated (S607).

If the language of the country decided based on the SIM card is consistent with the default language of the telephone 100, since there is no need to change the display language, the default language is directly determined as a display language (S608).

If they do not coincide in S607, whether or not the font of the language of the country decided based on the SIM card has been stored in the EEPROM 117 is discriminated (S609). In the present embodiment, fonts corresponding to languages of a plurality of countries have been stored in the EEPROM 117. Therefore, if the language decided based on the SIM card has been stored in the EEPROM 117, the language of the country decided based on the SIM card is set as a display language (S610). If it is not stored, the font of the language of the country corresponding to the SIM card is read out from of the SIM card and stored into the RAM 115 (S611). The font stored in the RAM 115 is set as a display language.

The font which is read out here is a font of characters and a font of simple alphabets which are used on a display screen for inputting the PIN code as will be described hereinafter.

Figure 7:
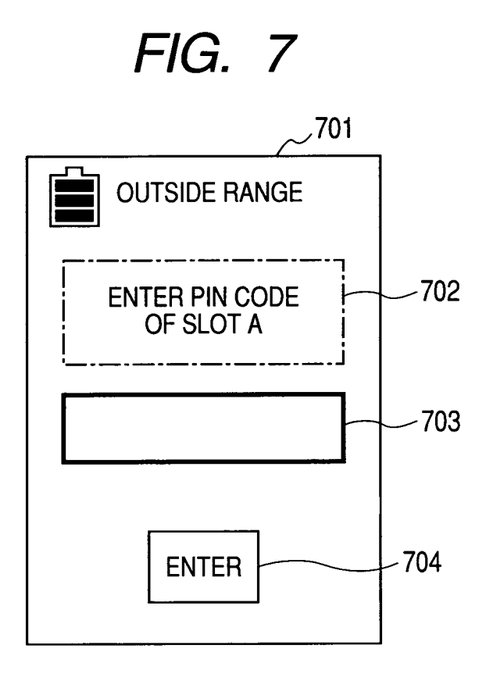
FIG. 7 is a diagram illustrating a display screen for authentication of the PIN code.

Subsequently, a display screen for the PIN code authentication is formed by using the set display language and displayed on the display unit 2 (S612). FIG. 7 is a diagram illustrating the input display screen of the PIN code.

A display screen 701 of the display unit 2 displays a message 702 for prompting the user to input. The user inputs the PIN code into an input column 703 by using the key operation unit 3. A cursor 704 for decision is provided. As a message 702, a cursor 704 for decision, and other display languages, the font of the display language decided in S608, S610, or S611 is used.

If the display language setting set by the user is effective in S605, the display screen for the PIN code authentication is formed by the display language set by the user and displayed onto the display unit 2 (S620).

When the PIN code is input by the user after the PIN code inputting display screen is displayed, whether or not the input code coincides with the PIN code read out from the SIM card is discriminated (S613). Until the authentication is successfully made, the display screen cannot be erased and the telephone call and other functions cannot be used either. In the present embodiment, each time the user inputs the PIN code and operates the deciding cursor, whether or not it coincides is discriminated. If the code input by the user does not coincide with the PIN code read out of the SIM card a predetermined number of times (for example, three times), it is determined that the authentication of the PIN code has failed.

When the authentication of the PIN code fails, an SIM authentication lock code for handling the SIM card as being illegal authentication is set and the user is notified of an authentication failure message and a message for prompting the user to input a code for unlocking the lock (S621). The SIM card which has failed in authentication of the PIN code cannot be used until the code for unlocking the lock is input. The code for unlocking the lock is obtained by inquiring of the carrier with which the user has contracted the SIM card.

If the PIN code coincides and the SIM card is correctly authenticated, whether or not the authentication of the PIN code has been finished with respect to all SIM cards to which the PIN code authentication processing should be executed is discriminated (S614).

If the PIN code authentication is not finished with respect to all of the SIM cards, the unauthenticated slot is set to the read-out subject slot. The processing routine is returned to S605 and the processes are repeated (S615).

When the PIN code authentication processing has been finished with respect to all of the SIM cards, whether or not the communication by both of the SIM cards can be made is discriminated (S616). In this instance, whether or not the communication by each SIM card including the SIM card for which the PIN code authentication processing is unnecessary can be made is discriminated. The communication by the SIM cards which has failed in the PIN code authentication processing cannot be made.

If the communication by both of the SIM cards can be made, whether or not the two SIM cards are the cards according to separate carriers (communication systems) is discriminated based on the identification information read out of the card of each slot (S617).

If the two cards are the cards corresponding to the separate carriers, both of the communication units 122 and 123 are made operative (S618). The communication telephone line to be used is determined based on the identification information of each card. If the two SIM cards are the cards corresponding to the same carrier, the corresponding one of the communication units 122 and 123 is made operative based on the identification information of each card (S619).

If the communication by both of the SIM cards cannot be made in S616, whether or not only the communication by one of the SIM cards can be made is discriminated (S622). If only the communication by one of the SIM cards can be made, a communication circuit of the carrier of the corresponding one of the communication units 122 and 123 is made operative based on the identification information of the SIM card which can be communicated (S623).

If both of the SIM cards failed in the PIN code authentication and cannot communicate, warning information showing that the PIN code authentication has failed and the telephone 100 cannot be used is displayed onto the display unit 2 and the processes are finished (S624).

If the SIM card has been inserted only one of the two SIM slots 9 and 10 in S601, whether or not the setting of the display language by the user is effective is discriminated (S625). If the display language setting is not effective, the subscriber information is read out from the inserted SIM card and stored into the RAM 115 (S626).

Subsequently, in the subscriber information read out from the SIM card, the language according to the mobile communication country code 503 is compared with the using language which has initially been set in the telephone 100 (S627).

If the language of the country decided based on the SIM card is consistent with the default language of the telephone 100, since there is no need to change the display language, the default language is immediately determined as a display language (S628).

If they do not coincide in S627, whether or not the font of the language of the country decided based on the SIM card has been stored in the EEPROM 117 is discriminated (S634). If the font has been stored, the language of the country decided based on the SIM card is set as a display language (S635). If it is not stored, the font of the language of the country corresponding to the SIM card is read out from the SIM card and stored into the RAM 115 (S636). The font stored in the RAM 115 is set as a display language.

Subsequently, a display screen for the PIN code authentication is formed by using the set display language and displayed on the display unit 2 (S629).

If the display language settings set by the user are effective in S625, a display screen for the PIN code authentication is formed by the display language set by the user and displayed on the display unit 2 (S633).

If the PIN code is input by the user after the PIN code inputting display screen was displayed, whether or not the input code coincides with the PIN code read out from the SIM card is discriminated (S630).

When the PIN code authentication fails, the SIM authentication lock code for handling the SIM card as being illegal authentication is set and the user is notified of the authentication failure message and a message for urging the user to input the code for unlocking the lock (S632).

If the PIN code coincides and the SIM card is correctly authenticated, the communication carrier which is used is discriminated based on the identification information of the SIM card. One of the communication units 122 and 123 corresponding to the carrier to be used is made operative, thereby enabling the communicating operation to be executed by the communication unit (S631).

In the case where PIN code authentication processing is finished and the PIN codes are correctly authenticated with respect to all of the SIM cards as mentioned above, the language of the SIM card whose authentication has finally and successfully been made is set to the display language of the telephone 100. Thus, display screens other than the display screen for the authentication are also displayed by the language of the SIM card whose authentication is successful. If the priority has been set in step S604, the language of the SIM card having the high priority instead of the SIM card which is lastly authenticated is used as a display language.

In the case where the display language is changed by the user after the authentication of the PIN code, a case where it does not coincide with the language according to the country information of the SIM card is considered.

In the present embodiment, even in such a case, since the display language set by the user is effective until the SIM card is replaced, the PIN code input display screen is displayed by the language set by the user.

As described above, according to the present embodiment, the display language on the display screen for inputting the PIN code is set based on the country information stored in the SIM card. Therefore, since the display screen for inputting the PIN code can be displayed by the language of the country in which a contract for the cellular phone has been made, the user can easily recognize the necessity of the input of the PIN code.

By allowing the font information to be held in the SIM card, even in a cellular phone having no display language font, information can be displayed by a desired language. Consequently, font data which is prepared for the cellular phone can be reduced.

In the present embodiment, the priority has been set into the SIM slot.

Besides it, the priority can be also set based on the carrier, accounting information, or contract information such as a service or the like.

Information such as time information or the like other than the display language, a display location of each information, or the like can be also changed according to each country.

In the present embodiment, when the display language is set, the country information read out from the SIM card has been used. However, besides it, the language information can be also specified by using, for example, the carrier information or phone book.

Whether or not the language based on the country information of the SIM card coincides with the default language has been discriminated in S607 in FIGS. 6A and 6B. However, the language based on the country information of the SIM card may be set as a display language irrespective of the default language.

Besides the cellular phone, the invention can be also similarly applied to an apparatus for making communication by using the peculiar identification information such as an SIM card, that is, the apparatus for executing the authentication processing using the authentication code such as a PIN code or the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-181113, filed Jul. 10, 2007, and 2008-123436, filed May 9, 2008 which are hereby incorporated by reference herein in their entirety.

The invention claimed is:

1. A communication apparatus comprising:
   an interface unit constructed to read out communication carrier identification information from a storage medium which stores a plurality of information including the communication carrier identification information;
   a communicating unit constructed to perform communication by using a communication carrier;
   an authenticating unit constructed to perform an authentication;
   a control unit constructed to identify, based on the communication carrier identification information read out from the storage medium by the interface unit, the communication carrier for the communication performed by the communication unit and to control a communicating operation by the communicating unit in accordance with the communication carrier identified by the communication carrier identification information read out by the interface unit; and
   a display unit constructed to display an authenticating display screen for making the authentication,
   wherein the control unit decides a display language in accordance with the communication carrier identification information read out by the interface unit and generates a display signal of the authenticating display screen according to the decided display language.

2. An apparatus according to claim 1, wherein the plurality of information stored in the storage medium includes authentication information and the communication carrier identification information includes communication carrier country information, the authenticating unit makes the authentication by using the authentication information, and the control unit decides the display language in accordance with the communication carrier country information.

3. An apparatus according to claim 2, further comprising an operating unit constructed to input a code by using the authenticating display screen displayed by the display unit,
   wherein the authenticating unit makes the authentication by comparing the code input by the operating unit with the authentication information.

4. An apparatus according to claim 2, wherein the control unit sets a first official language of a country corresponding to the communication carrier country information to the display language.

5. An apparatus according to claim 1, further comprising a plurality of slots into each of which the storage medium is inserted,
wherein the authenticating unit makes the authentication by using the authentication information read out from each of a plurality of storage media, and the control unit decides the display language of the authenticating display screen for the plurality of storage media based on the communication carrier identification information read out from the plurality of storage media.

6. An apparatus according to claim 1, further comprising a setting unit constructed to set the display language,
wherein the control unit inhibits the change in the display language by the setting unit until the authentication by the authenticating unit is successful.

7. An apparatus according to claim 6, further comprising a slot for inserting the storage medium thereinto, and an operating unit constructed to turn on a power source of the apparatus,
wherein the authenticating unit makes the authentication each time the power source is turned on by the operating unit, and
wherein according to the turn-on of the power source, the control unit discriminates whether or not the storage medium has been replaced after the authentication by the authenticating unit is successful, if the storage medium is not replaced, the control unit generates the display signal of the authenticating display screen of the display language set by the setting unit, and if the storage medium has been replaced, the control unit generates the display signal of the authenticating display screen of the display language decided by using the read-out communication carrier identification information.

8. An apparatus according to claim 1, further comprising a setting unit constructed to set whether or not the authentication by the authenticating unit is executed,
wherein the interface unit writes execution information of an authentication processing showing whether or not the authentication is executed into the storage medium according to a setting result by the setting unit.

9. An apparatus according to claim 8, wherein the interface unit reads out the execution information of the authentication processing from the storage medium, when the execution of the authentication has been set by the read-out execution information of the authentication processing, the control unit enables the communicating operation by the communicating unit according to the success of the authentication by the authenticating unit, and when the execution of the authentication is not set, the authentication by the authenticating unit is not performed and the control unit enables the communicating operation by the communicating unit.

10. An apparatus according to claim 1, further comprising a memory that stores fonts of languages of a plurality of countries,
wherein the control unit generates the display signal of the authenticating display screen by using the font of the decided display language among the fonts stored in the memory.

11. An apparatus according to claim 10, wherein if the font of the language of the country decided based on the communication carrier identification information is not stored in the memory, the control unit controls the interface unit so as to read out the information of the font from the storage medium and controls the display unit to generate the display of the authenticating display screen by using the read-out font.

12. An apparatus according to claim 1, wherein the storage medium is an SIM card.

13. An apparatus according to claim 1, wherein the control unit further generates a display signal of a display screen other than the authenticating display screen according to the decided display language.

14. A communication method comprising the steps of:
reading out communication carrier identification information from a storage medium which stores a plurality of information including the communication carrier identification information and authentication information;
communicating by using a communication carrier;
performing an authentication by using the authentication information read out by the reading step;
identifying, based on the communication carrier identification information read out from the storage medium by the reading step, the communication carrier for the communication performed by the communicating step and controlling a communicating operation by the communicating step in accordance with a result of the authentication and the communication carrier identified by the communication carrier identification information read out by the reading step; and
displaying an authenticating display screen for making the authentication,
wherein the controlling step includes deciding a display language in accordance with the communication carrier identification information read out by the reading step and generating a display signal of the authenticating display screen according to the decided display language.

* * * * *